United States Patent
Sviberg et al.

(10) Patent No.: US 12,509,001 B2
(45) Date of Patent: Dec. 30, 2025

(54) ROOF SENSOR MODULE AND MOTOR VEHICLE

(71) Applicant: Webasto SE, Stockdorf (DE)

(72) Inventors: Magnus Sviberg, Stockdorf (DE); Maximilian Ehrmann, Stockdorf (DE); Cèdric Langlais, Stockdorf (DE); Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 378 days.

(21) Appl. No.: 18/170,846

(22) Filed: Feb. 17, 2023

(65) Prior Publication Data

US 2023/0278503 A1    Sep. 7, 2023

(30) Foreign Application Priority Data

Mar. 4, 2022  (DE) .................. 10 2022 105 178.1

(51) Int. Cl.
B60R 11/02    (2006.01)
B60R 11/04    (2006.01)
(Continued)

(52) U.S. Cl.
CPC .......... B60R 11/04 (2013.01); B60R 16/0215 (2013.01); B62D 25/06 (2013.01);
(Continued)

(58) Field of Classification Search
CPC ....... B60R 11/04; B60R 11/00; B60R 1/0215; B60R 16/0215; B62D 25/06;
(Continued)

(56) References Cited

U.S. PATENT DOCUMENTS 6,550,851 B2 *  4/2003  Seifert ................ B62D 27/02
                                                            296/210
7,100,974 B2 *  9/2006  Schonebeck ......... B62D 29/004
                                                            296/223
(Continued)

FOREIGN PATENT DOCUMENTS

CN      102060056 A      5/2011
CN      208559531 U      3/2019
(Continued)

OTHER PUBLICATIONS

Office Action issued in corresponding Chinese Application No. CN 202310197531.3; mailed Jul. 21, 2025 ; In Chinese with English machine translation (26 pages).

*Primary Examiner* — Dennis H Pedder
(74) *Attorney, Agent, or Firm* — Fitch, Even, Tabin & Flannery, LLP

(57) ABSTRACT

A roof sensor module having a panel component which forms at least sections of a roof cladding of a vehicle roof, the roof cladding functioning as an outer sealing surface of the roof sensor module, at least one environment sensor for charting a vehicle environment which is connected to at least one cable, and at least one channel-shaped carrier structure. The at least one cable is guided along the channel-shaped carrier structure within a hollow cross section thereof and/or an in particular channel-shaped guide profile is formed at the channel-shaped carrier structure, the at least one cable being guided along the channel-shaped guide profile.

16 Claims, 4 Drawing Sheets

(51) Int. Cl.
*B60R 16/02* (2006.01)
*B62D 25/06* (2006.01)
*G01S 7/481* (2006.01)
*G01S 17/931* (2020.01)
*B60R 11/00* (2006.01)

(52) U.S. Cl.
CPC .......... *G01S 7/4813* (2013.01); *G01S 17/931* (2020.01); *B60R 2011/004* (2013.01)

(58) Field of Classification Search
CPC .... G01S 13/931; G01S 17/931; G01S 7/4813; H02G 3/36; H02G 3/38
USPC ....................................................... 296/210
See application file for complete search history.

(56) References Cited

U.S. PATENT DOCUMENTS

| | | | |
|---|---|---|---|
| 10,137,937 B1 | 11/2018 | Sahi | |
| 11,731,705 B2* | 8/2023 | Friedrich | ................ B60R 16/02 |
| | | | 296/210 |
| 2019/0210546 A1* | 7/2019 | Slovesko | ............ B60R 16/0231 |
| 2022/0161860 A1 | 5/2022 | Friedrich | |

FOREIGN PATENT DOCUMENTS

| | | | |
|---|---|---|---|
| CN | 111483405 A | 8/2020 | |
| DE | 102006002123 A1 | 7/2007 | |
| DE | 102018129331 A1 | 6/2019 | |
| DE | 102019105339 A1 | 9/2020 | |
| DE | 102020101666 B3 | 12/2020 | |
| DE | 102019128392 A1 | 4/2021 | |
| WO | 2020177804 A1 | 9/2020 | |
| WO | 2021021516 A1 | 2/2021 | |

\* cited by examiner

ROOF SENSOR MODULE AND MOTOR VEHICLE

CROSS-REFERENCE TO RELATED APPLICATION

This application claims priority from German Patent Application Number 10 2022 105 178.1, filed on Mar. 4, 2022, which is hereby incorporated herein by reference in its entirety for all purposes.

FIELD

The invention relates to a roof sensor module for forming a vehicle roof on a motor vehicle according to the preamble of claim 1. Furthermore, the invention relates to a motor vehicle according to the preamble of claim 9.

BACKGROUND

Roof modules are extensively used in vehicle manufacturing since these roof modules can be prefabricated as separate functional modules and can be delivered to the assembly line when assembling the vehicle. Furthermore, roof sensor modules are known. The roof module forms at least sections of a roof cladding of the vehicle roof, the roof cladding preventing moisture and air flows from entering the vehicle interior. The roof cladding is composed of one or more panel components, which can be made of a stable material, such as painted metal or painted or solid-colored plastic. The roof module can be a part of a fixed vehicle roof or a part of an openable roof sub-assembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of electric and/or electronic and/or electromagnetic components, in particular environment sensors (e.g., lidar sensors, radar sensors, (multi-) cameras, etc. including other (electrical) components) are employed, which are integrated in the roof module, for example, and which chart the environment surrounding the motor vehicle and determine, for example, a current traffic situation from the acquired environment data. Roof modules which are equipped with a plurality of environment sensors are also known as roof sensor modules (RSM). For this purpose, the known environment sensors transmit and/or receive electromagnetic signals, such as laser beams or radar beams, allowing a data model of the vehicle environment to be generated by suitable signal evaluation and to be used for controlling the vehicle.

The environment sensors and other electric and/or electronic and/or electromagnetic components for monitoring and/or charting the vehicle environment are typically mounted on the vehicle roof since the vehicle roof is typically the highest point of a vehicle, from where the vehicle environment is easily visible. The components and/or environment sensors typically top off the panel component of the roof module, which forms the roof cladding; alternatively, they can also be disposed in an opening of the roof module and be adjustable between a retracted position and a deployed position.

In view of increasing mechanization and/or automation in the motor vehicle industry, the demand for in particular current-carrying and/or signal-transmitting cables has increased which connect the different technical components installed in the roof sensor module to each other and/or to a control apparatus and/or power source, for example. For instance, there is a necessity to connect the plurality of electric and/or electronic and/or electromagnetic components, in particular environment sensors, to an evaluation and control apparatus configured to virtually reconstruct the charted vehicle environment from the individual sensor signals. The evaluation and control apparatus thus forms a kind of central intelligence, which allows the vehicle at least partially autonomous driving. Moreover, a demand of different technical components, for example, can remain via which the infotainment range is provided to the driver and/or passengers. These components, such as screens, touchscreens, microphones and/or speakers, each also require at least one cable connection in order to be connected to a corresponding power source and/or evaluation and/or control apparatus. Depending on the technical complexity of the components, it may also occur that a plurality of cables is required for an individual component in order to ensure a supply of electric power and an in particular multi-channel signal flow, for example. Since components such as the evaluation and/or control apparatus and/or the power source are often not installed in the periphery of the corresponding components because of the installation space they require, it is often necessary to lay the cables across and/or lengthwise through the motor vehicle.

In this case, the plurality of cables in the state of the art is often gathered to make up at least one cable harness which is then laid as a unit within the vehicle chassis. For cable structures or cable harnesses of this kind, a considerable amount of installation space is required, which, however, is a limited resource in vehicle manufacturing. In other words, the cable harnesses require a large amount of installation space. Moreover, there are often limitations regarding their bending radius because of their thickness (of the diameter) and/or their proneness to disturbances which results from their buckling load. These limitations restrict the design liberty when laying the cable harness within the motor vehicle, which in the end leads to more installation space being required. Moreover, protective devices, such as radius brackets and/or protective tubes and/or grommets, are required for laying the cable harnesses in order to avoid possible damage to the cable harness during its service life. If a cable harness comprises cables of environment sensors and the like, which are guided from the corresponding environment sensor to a central evaluation and control apparatus, such as an ADAS control system, disposed in a trunk, for example, this set of problems becomes more pronounced as such cables are particularly prone to outer damage and/or bends and/or crimping, which can negatively impact the functionality of the corresponding environment sensor. Moreover, only little installation space is available in the roof area of the motor vehicle, in particular regarding roof sensor modules, meaning guiding the cable harnesses often has to be very complex, for example by accepting sharp bending radii (corner guiding). The previously described set of problems regarding installation space can be made more difficult by protective devices having to be disposed between a vehicle interior or passenger cabin and a corresponding cable harness in addition to laid cables. These protective devices can have additional molded parts, foamed parts and/or interior lining of the passenger cabin, for example, and preferably be designed to shield passengers from an electromagnetic field surrounding the cables and/or the cable harness.

SUMMARY

For this reason, the object of the invention is to propose a roof sensor module and/or a motor vehicle having a roof sensor module which avoids the disadvantages described above of the known state of the art and to minimize in particular the set of problems mentioned above regarding installation space when laying cables and/or a cable harness.

This object is attained by a roof sensor module according to the teachings of claim 1. Furthermore, the object is attained by a motor vehicle having at least one roof sensor module of this kind according to the invention. Equally, the object is attained by a motor vehicle according to the teachings of claim 8.

Advantageous embodiments of the invention are the subject matter of the dependent claims. Moreover, all combinations of at least two features disclosed in the description, the claims, and/or the figures fall within the scope of the invention. Naturally, the explanations given in connection with the roof sensor module equivalently relate to the motor vehicle according to the invention, without having to be explicitly mentioned. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The roof sensor module according to the invention comprises a panel component, which forms at least sections of a roof cladding of a vehicle roof, the roof cladding functioning as an outer sealing surface of the roof sensor module. Furthermore, the roof sensor module comprises at least one environment sensor for charting a vehicle environment which is connected to at least one cable. Furthermore, the roof sensor module comprises at least one channel-shaped carrier structure, preferably having a hollow cross section. The roof sensor module according to the invention is characterized in that the at least one cable is guided along the channel-shaped carrier structure within a hollow cross section thereof and/or in that an in particular channel-shaped guide profile is formed at the channel-shaped carrier structure, the at least one cable being guided along the channel-shaped guide profile.

The motor vehicle according to the invention comprises a vehicle chassis having at least one chassis roof beam and a roof sensor module. The roof sensor module has a panel component, which forms at least sections of a roof cladding of a vehicle roof which functions as an outer seal surface of the roof sensor module. Furthermore, the roof sensor module comprises at least one environment sensor for charting a vehicle environment, which is connected to at least one cable. The roof sensor module is disposed at the vehicle chassis to form a vehicle roof. The motor vehicle according to the invention is characterized in that at least one cable is guided along the in particular channel-shaped chassis roof beam within a hollow cross section and/or in that a channel-shaped guide profile is formed at the channel-shaped chassis roof beam, the at least one cable being guided along the channel-shaped guide profile, and/or in that at least one cable guide channel is formed between the roof sensor module and the at least one chassis roof beam, the at least one cable being guided within and along a cable guide channel. Particularly preferably, the chassis roof beam forms at least a part of the roof-sided vehicle chassis. Particularly preferably, the at least one chassis roof beam is connected to at least an A pillar and/or B pillar and/or C pillar and/or a D pillar and thus forms a part of the vehicle chassis.

The at least one cable is preferably designed to supply electric power to the at least one environment sensor and/or electric and/or electronic and/or electromagnetic component and/or to transmit signals, in particular electric signals, received from the environment sensor and/or the electric and/or electronic and/or electromagnetic component to an evaluation and/or control apparatus, for example, and/or to transmit signals, in particular electric signals, to the environment sensor and/or the electric and/or electronic and/or electromagnetic component. The at least one cable preferably allows a bidirectional signal flow. Presently, the at least one cable can be synonymous with a cable harness. A cable harness of this kind preferably comprises a plurality of cables, which are gathered at the cable harness as required from different source directions at least along a corresponding longitudinal section of the individual cable.

The at least one carrier structure is preferably designed to reinforce the roof sensor module at least in one spatial dimension. The carrier structure preferably functions as a reinforcing structure, meaning the roof sensor module is reinforced at least in one spatial dimension via the carrier structure. Via the carrier structure, the roof sensor module preferably has a predetermined degree of bending and/or torsional strength and preferably suffices for predetermined demands on reinforcement.

Alternatively or additionally (i.e., and/or) to cable being guided within the carrier structure as intended by the invention, which is provided at the roof sensor module, it is preferred to guide the at least one guide cable within the at least one guide profile. Sections of the guide profile can preferably be formed at the carrier structure. The guide profile preferably forms a longitudinal notch and/or a groove in which the at least one cable can be guided. The guide profile is preferably guided at an outer side of the carrier structure, which, however, preferably is directed towards an interior of the roof sensor module. This arrangement of the guide profile simplifies an accessibility of the cable guide, as the cable does not necessarily have to be guided through the interior of the carrier structure. It is also possible to guide sections and/or areas of the at least one cable within the roof sensor module through the interior of the carrier structure and in the at least one guide profile starting from the at least one environment sensor and/or other electric and/or electronic and/or electromagnetic components. Thus, it is possible, for example, to guide the at least one cable in the area of a corner through the interior of the carrier structure and to otherwise guide it within the guide profile. This can effectively prevent sharp bending radii when guiding cables. It is therefore possible to use both the carrier structure or a channel-shaped hollow in their interior and the at least one guide profile for guiding cables.

According to the invention, it is possible to actively use an installation space which is unused in the state of the art and is available depending on its design in the at least one carrier structure and/or the at least one guide profile and/or the at least one chassis beam for guiding the at least one cable. This allows saving installation space in the motor vehicle otherwise needed for guiding cables in this manner. This is of great advantage especially in the roof area. By saving installation space, the design liberty can be increased, meaning, for instance, a larger interior dimensioning and/or a larger surface for sun and/or panoramic roofs is made possible. In addition to the advantage brought about by the installation space, the cable guiding can be improved by the preferably channel-shaped hollow in the at least one carrier structure and/or the at least one chassis beam. For instance, components otherwise required for the cable guiding, such as guide rails and/or corner guides, can be foregone since the channel-shaped hollow provides sufficient separation and protection for the cable guiding. This makes it possible to optimize a total weight and the production costs for the complete vehicle. Moreover, the invention makes it possible to combine at least one cable harness of the at least one environment sensor, which particularly preferably comprises a plurality of the at least one cable, with at least one other cable harness, for example of an illumination and/or an infotainment device, available in the roof area in order to be able to save installation space in this manner. Moreover, the laying of the least one cable as intended by the invention brings advantages for the vehicle assembly, as a number of work steps become unnecessary with respect to typical cable laying or cable guiding.

The roof module can form a structural unit in which features for autonomous or semi-autonomous driving assisted by driver assistance systems are integrated and which can be placed on a vehicle body shell as a structural unit by a vehicle manufacturer. The roof sensor module according to the invention can, in simple terms, be a roof module which forms at least sections of a vehicle roof of a motor vehicle. Furthermore, the roof module according to the invention can be a purely fixed roof or a roof including a roof opening system. Moreover, the roof sensor module can be configured for use with a passenger car or a utility vehicle. The roof module can preferably be provided as a structural unit in the form of a roof sensor module (RSM), in which the at least one environment sensor is provided, so as to be inserted into a roof frame of a vehicle body as a suppliable structural unit.

Generally, the environment sensor can be designed in many different forms and in particular be a lidar sensor, a radar sensor, an optical sensor, such as a camera, and/or the like. Lidar sensors function in a wavelength range of 905 nm or even approximately 1550 nm. The raw material of the roof cladding in the viewing area should be transparent for the wavelength range used by the environment sensor and the material should therefore be chosen depending on the wavelength(s) used by the environment sensor(s).

In a preferred embodiment, the at least one channel-shaped carrier structure forms at least a part of a roof module frame, in particular a transverse module beam and/or a longitudinal module beam. A roof module frame of this kind is preferably designed to function as an interface between a vehicle chassis and the panel component. The roof module frame preferably reinforces the roof sensor module, meaning it fulfills demands to reinforcing requirements for assembly and its intended use, i.e., in a state disposed on the vehicle and forming at least sections of the roof cladding. A roof module frame of this kind preferably comprises at least one transverse beam connected to at least two longitudinal beams to form a frame. Particularly preferably, the roof module frame forms a self-contained frame structure. According to this embodiment, at least one part of this roof module frame serves for guiding the at least one cable. In this manner, it is possible to use the otherwise unused channel-shaped hollow within the carrier structure forming the roof module frame for guiding cables. The at least one carrier structure of the roof module frame preferably comprises a hollow-shaped cross section (viewed orthogonal to a corresponding length of the carrier structure). Particularly preferably, the roof module frame comprises a contiguous, channel-shaped hollow which forms the installation for the at least one cable. This makes it possible, for instance, to lay the at least one cable along the entire roof module frame. This enables great liberties in design and manufacturing in particular regarding a cable exit in order to connect the at least one cable to, for example, an evaluation and/or control apparatus and/or a power source. The at least one carrier structure can be disposed at the at least one panel component as a carrier-like and/or beam-like component. Via the carrier structure and/or the roof module frame, the roof sensor module can preferably be disposed at the vehicle chassis.

In a preferred embodiment, the channel-shaped carrier structure is formed in particular integrally at the panel component. Alternatively or additionally to the at least one carrier structure being disposed as an additional component at the at least one panel component, it can also be formed thereon. For instance, it is possible for the carrier structure to be formed at the at least one panel component, in particular in view of a deep-drawing method and/or an injection-molded method. The carrier structure can be formed in particular in one piece at the panel component to reinforce it. This has the advantage that no additional carrier structures need be affixed at the panel component. In this embodiment, the roof sensor frame is thus preferably formed integrally at the panel component, meaning the roof sensor module preferably comprises an integrated roof module frame, via which it can be disposed at, in particular glued to, the vehicle chassis.

In a preferred embodiment, the roof sensor module comprises a roof module frame which is connected in such a manner to the panel component that the channel-shaped carrier structure is formed between the roof module frame and the panel component. According to this embodiment, the installation space provided for the cable guiding is therefore not formed via a hollow within the carrier structure itself; indeed, the channel-shaped hollow is formed by at least areas of the panel component being spaced apart from the roof module frame, for example topped thereon for being fastened. In this embodiment, the roof module frame can be formed integrally at the panel component, as the design makes it possible even in this embodiment to form a hollow of this kind, which is used for cable guiding, between the panel component and the at least one carrier structure provided thereon. This embodiment can be advantageous as the interior of a hollow of this kind is possibly easily accessible for laying and/or affixing the at least one cable.

In a preferred embodiment, the channel-shaped guide profile is formed integrally at the panel component. In another preferred embodiment, the roof sensor module comprises a roof module frame which is connected to the panel component and is formed in particular integrally at the channel-shaped guide profile. Particularly preferably, the channel-shaped guide profile is formed at the carrier structure, which is provided, in particular formed integrally, at the panel component. The channel-shaped guide profile can generally be formed in a different manner at the panel component, such that a cable guiding is made possible within the channel-shaped guide profile. At least sections of the channel-shaped guide profile are preferably provided in an edge area of the panel component, meaning a cable guiding is made possible in the edge area. This is of advantage if cable is guided to other areas of the motor vehicle starting from the roof area, as an A pillar and/or a B pillar and/or a C pillar and/or a D pillar, for example, can be used for continuing to guide the least one cable from the edge area of the roof.

In a preferred embodiment, the at least one cable is retained via at least one affixing element within the channel-shaped carrier structure and/or within the channel-shaped guide profile. An affixing element of this kind can generally be designed in any manner. For instance, the affixing element can be configured to fixate and/or affix at least sections of the at least one cable in the guide profile so that the cable is laid in the guide profile without running the risk of becoming lost. A fixation of this kind can be suitable in a corner area in order to secure the at least one cable in this corner area so that it does not fall out. The at least one affixing element preferably serves as a securing element. For instance, the at least one affixing element can be designed as a screw plate and/or a fixating and/or clip element.

According to a preferred embodiment, the roof sensor module can also comprise at least one electrical and/or electronic and/or electromagnetic component additionally or alternatively to the at least one environment, the component being able to be an antenna and/or a measuring sensor and/or a communication feature and/or a light feature. Of course, the component can also comprise more than one of each of the mentioned components. It is merely preferred that at least one component is disposed in the roof sensor module and/or the motor vehicle according to the invention which has to be connected to another component via cable, meaning guiding cable within the roof sensor module and/or the roof area of the motor vehicle is required and this can be realized in a manner intended by the invention. The antenna can be an electrical or magnetic antenna. The measuring sensor can be a temperature sensor, a humidity sensor, a GPS sensor, an acceleration sensor and/or a similar measuring sensor, for example. The communication feature can be a WLAN interface, an LTE interface or another near-, medium- or long-range communication interface. The communication feature allows the motor vehicle to communicate with a vehicle environment and in particular to transmit and/or receive data. The light feature can comprise one or more than one lights. The lights are in particular configured to indicate an autonomous or partially autonomous driving mode and/or different driving mode situations of the motor vehicle. The environment sensor according to the invention can basically be configured in various ways and can comprise a lidar sensor, a radar sensor, an optical sensor, such as a camera or a multi-camera, an ultrasonic sensor and/or the like. Lidar sensors, for example, operate in a wavelength range of 905 nm or approximately 1550 nm. A material in a viewing area of the environment sensor is preferably transparent to a wavelength range used by the environment sensor and selected as a function of the wavelength(s) used by the environment sensor. Of course, merely a signal detection unit, such as an optical sensor and/or a photo chip, may be disposed on the vehicle body. Evaluation electronics, in particular referred to as a camera control unit (CCU), which is configured to evaluate the signals detected by the optical sensor, can be disposed separately therefrom in another area of the motor vehicle, for example.

In a preferred embodiment, the roof sensor module is disposed at a vehicle chassis of a motor vehicle as a component. The roof sensor module can be disposed at the vehicle chassis via an arrangement at the at least one longitudinal beam and/or longitudinal carrier of the vehicle roof frame on the side of the vehicle chassis preferably via an adhesive connection, a screw connection and/or a welt connection. The roof sensor module can preferably form a structural unit, in which apparatuses for autonomously or partially autonomously driving supported by driving assistance systems are integrated and can be topped up on and/or be disposed at a vehicle carcass as a unit by a manufacturer. Furthermore, the roof sensor module according to the invention can be a purely rigid roof or even a roof panel element including roof opening systems in one embodiment of the roof panel element. Furthermore, the roof sensor module according to the invention can be configured for use in a passenger car or a utility vehicle.

According to the invention, a motor vehicle is particularly preferably intended which comprises a chassis roof frame and a roof sensor module according to an embodiment of the invention, which is disposed on the chassis roof frame. Furthermore, a motor vehicle of this kind preferably comprises an evaluation and/or control apparatus and/or an energy source, in particular a battery, which is disposed in an installation space within the vehicle chassis and is connected to the at least one environment sensor via the at least one cable. Where the evaluation and/or control apparatus and/or the power source are disposed within the vehicle chassis is generally arbitrary. Generally, the at least one environment sensor and/or the at least one component can be connected to other and/or several technical components via the at least one cable, these technical components being able to be disposed in different areas of the vehicle, for example. For instance, the at least environment sensor can be connected to a power source, which is disposed in a bottom area of the vehicle, via the at least one cable and be connected to the evaluation and/or control apparatus, which is disposed in a rear or front area of the motor vehicle, for example, via at least one other cable. Owing to the spaced apart arrangement of the different technical component, such as the evaluation and/or control apparatus and/or the power source, which exists owing to an installation space available locally in only a limited manner in the motor vehicle, the cable guiding according to the invention is necessary as the at least one cable must be guided to other places in the motor vehicle from the corresponding electric and/or electronic and/or electromagnetic components, in particular the at least one environment sensor.

In a preferred embodiment of the motor vehicle according to the invention, the at least one chassis beam defines at least one transverse beam and/or at least one longitudinal beam, via which at least a part of a chassis roof frame is formed. Generally, the entire chassis roof frame can be used in a manner intended by the invention, meaning all beams forming the chassis roof frame can be used for cable guiding. It is particularly preferred if the at least one environment sensor and/or the at least one component is disposed in the area of a beam of this kind, for example, meaning the at least one cable can be guided directly from it via the transverse and/or the longitudinal beam. Particularly preferably, the at least one transverse beam and/or the at least one longitudinal beam forms a self-contained roof frame. Particularly preferably, the at least one longitudinal beam connects at least one A pillar and/or one B pillar and/or one C pillar and/or a D pillar to each other. Particularly preferably, the at least one transverse beam connects two A pillars and/or B pillars and/or C pillars and/or D pillars (which rise over the vehicle chassis on the left and right) to each other, i.e., the transverse beam is oriented perpendicular to a longitudinal direction of the motor vehicle.

In a preferred embodiment of the motor vehicle according to the invention, the roof sensor module comprises a roof module frame and the at least one cable-guiding channel is formed between the roof module frame and the at least one chassis roof beam. According to this embodiment, the roof sensor module can be disposed in such a manner at the chassis roof frame via the roof module frame that a channel-shaped hollow is formed between the two frames, the hollow being able to be used for guiding the at least one cable. The channel-shaped hollow is preferably formed so as to encircle the entire roof area.

In a preferred embodiment of the motor vehicle according to the invention, it comprises an evaluation and/or control apparatus and/or a power source, in particular a battery, which is disposed in an installation space within the vehicle chassis and is connected to the at least one environment sensor via the at least one cable. Where the evaluation and/or control apparatus and/or the power source is disposed within the motor vehicle is generally of no importance. Starting from the environment sensor and/or the at least one component, the at least one cable, in particular as a cable harness and/or cable strand, is preferably guided through the channel-shaped hollow and exits it preferably in an area where the corresponding component is disposed in the vehicle to which the at least one cable is to be connected. For instance, the cable can be guided as intended by the invention starting from the roof area to a vehicle interior and/or a front and/or rear space (or elsewhere in the vehicle) through other carrier parts having hollows, such as A, B, C and/or D pillars.

In a preferred embodiment of the motor vehicle according to the invention, the at least one cable is fixated via at least one affixing element within the channel-shaped chassis roof beam and/or within the channel-shaped guide profile. An affixing element can generally be formed in any manner. For instance, the affixing element can be configured to fixate and/or to affix at least sections of the at least one cable within the channel-shaped chassis roof beam and/or within the channel-shaped guide profile, meaning the cable can be laid without being able to be lost within the channel-shaped chassis roof beam and/or within the channel-shaped guide profile. A fixation of this kind can be suitable in corner areas, for example, to secure the at least one cable in this corner area so that it cannot fall out. The at least one affixing element preferably serves as a securing element. For instance, the at least one affixing element can be designed as a screw plate and/or a fixating and/or clip element.

It is understood that the at least one carrier structure and/or the at least one guide profile and/or the at least one chassis roof beam can comprise at least one bore and/or an opening for guiding the at least one cable, the at least one cable being able to be guided into an interior of the corresponding guide structure starting from the at least one environment sensor and/or the at least one component via the bore and/or opening. It is particularly preferred if a plurality of openings is available so that a cable guiding and/or insertion of the at least one cable which is as effective as possible takes place as closely as possible in the vicinity of the environment sensor and/or component. This allows using the available installation space particularly effectively.

Of course, the embodiments and the illustrative examples mentioned above and yet to be discussed below can be realized not only individually but also in any combination with each other without departing from the scope of the present invention. Moreover, any and all embodiments and illustrative examples of the sensor module also relate to a panel component, in particular a roof module, comprising such a sensor module and to a motor vehicle having such a panel component, in particular such a roof module.

BRIEF DESCRIPTIONS OF THE DRAWINGS

Embodiments of the invention are schematically shown in the drawing and are described in the following in an exemplary manner.

DETAILED DESCRIPTION

Figure 1:
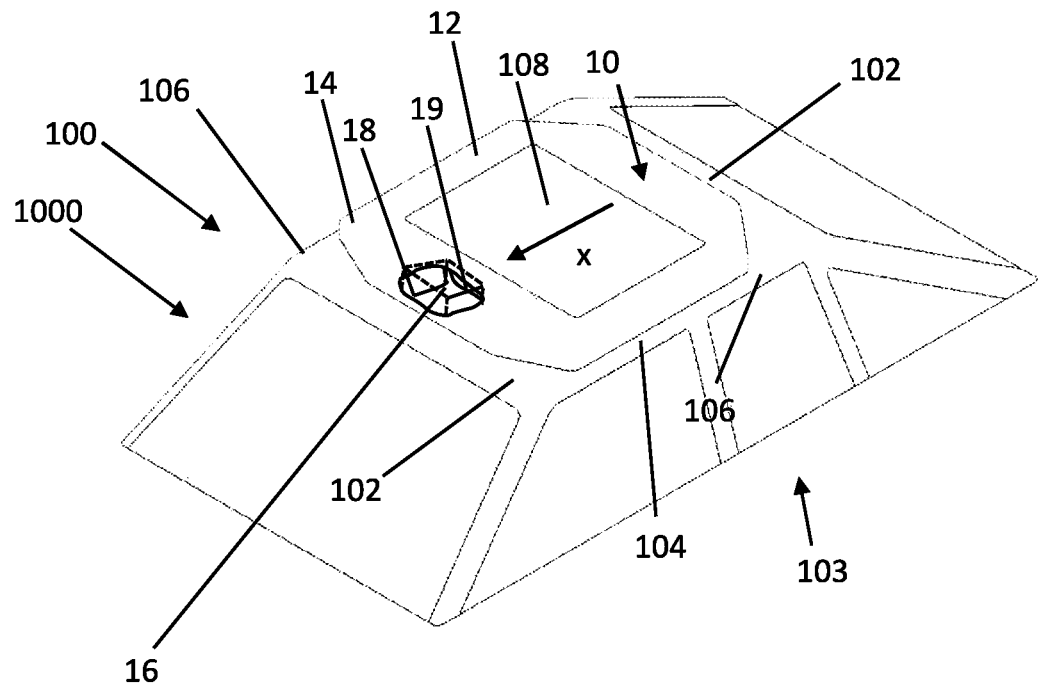
FIG. 1 shows a schematic view of a roof-side area of a motor vehicle having a roof sensor module according to the invention.

In FIG. 1, a motor vehicle 1000 (not shown in its entirety) having a vehicle roof 100 is shown. Vehicle roof 100 is shown as a roof module 10, in particular as a roof sensor module, as intended by the invention. Roof sensor module 10 is disposed as a structural unit at a chassis roof frame 104 of motor vehicle 1000, exemplarily topped up on two transverse beams 102 and two longitudinal beams 106, via which chassis roof frame 104 is formed. Roof sensor module 10 has a panoramic roof 108 in the shown exemplary embodiment.

Roof module 10 comprises a panel component 12 for forming at least sections of a roof cladding 14 of vehicle roof 100. In the present instance, panel component 12 together with panoramic roof 108 forms entire roof cladding 14 of motor vehicle 1000. In a front area of motor vehicle 100 and/or of roof module 10 (as viewed in a longitudinal vehicle direction x), an electric and/or electronic and/or electromagnetic component is disposed. At least one component 16 is presently an environment sensor 18 disposed in a component casing 19. Environment sensor 18 is a lidar sensor in this example. Other sensor types, such as multi-directional cameras, which are used for (partially) autonomous driving, can be used. Component casing 19 forms a dry area, in which environment sensor 18 is disposed in a fluid-tight manner.

Environment sensor 18 is disposed directly behind front transverse beam 102 which defines a roof header of the vehicle. According to FIG. 1, environment sensor 18 is displaceable between a retracted position and an extracted position and/or is disposed at a frame structure of roof module 10 so as to be retracted and extracted in an opening (not shown) in roof cladding 14 of roof module 10 (or is mounted thereon). In an alternative embodiment, environment sensor 18 and/or at least one component 16 is encompassed rigidly at or in roof module 10.

Figure 2:
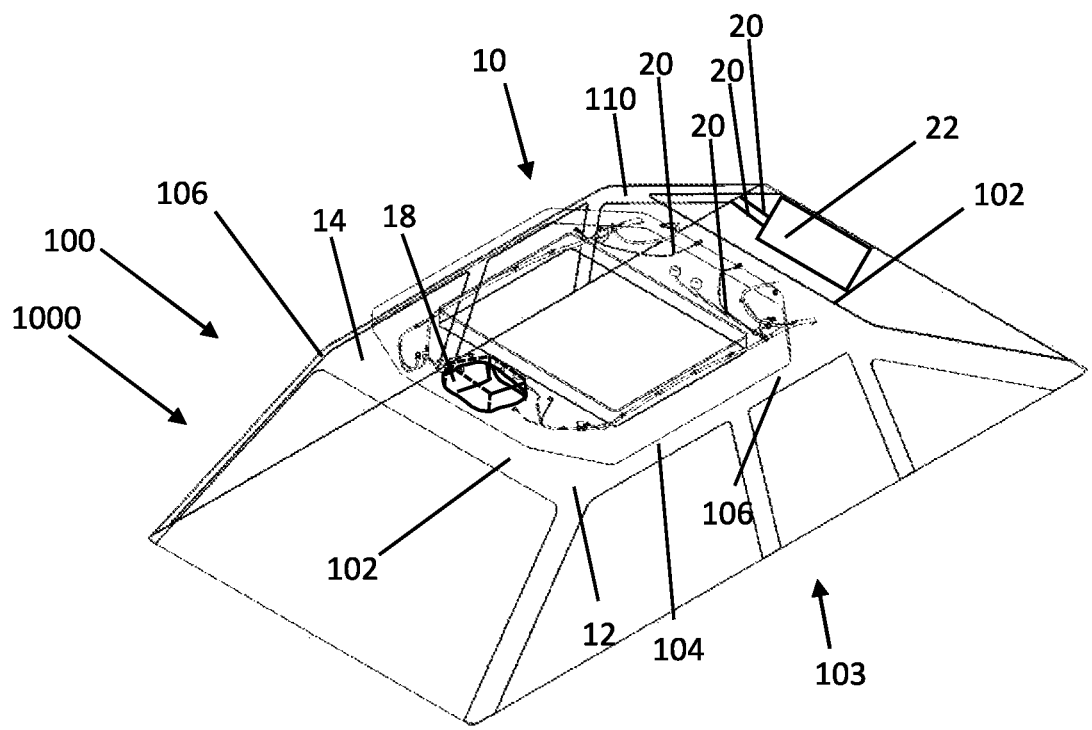
FIG. 2 shows a schematic view of a motor vehicle having a view of a cable guiding in the roof area.

According to FIG. 2, at least a part of panel component 12 and panoramic roof 108 is shown as blended out or transparent, meaning an interior area of roof sensor module 10 is exposed and thus can be viewed. At least one component 16 and/or at least one environment sensor 18 is connected to an evaluation and/or control apparatus 22, which is disposed in a rear space or trunk space of vehicle 1000 in a schematically simplified manner, via at least on cable 20, presently several cables which together form a cable harness. At least one cable 20 is laid in an installation space in the edge area of the chassis roof frame 104 on the left and right-hand side starting from environment sensor 18 viewed in moving direction x, for example, the installation space being formed between roof sensor module 10 and chassis roof frame 104 and having hitherto been unused. In each instance, at least one cable 20 extends along left and right lateral beam 106 to an area in the rearward transverse beam 102 in the center of the vehicle. Starting from the center area of the rearward transverse beam 102, at least one cable 20 is guided through a hollow, channel-shaped interior of a left-hand side C pillar (as viewed from the top) to evaluation and/or control apparatus 22. By using the channel-shaped installation space for guiding at least one cable 20, the cable guiding can be designed to be more effective. Evaluation and/or control apparatus 22 is configured to evaluate the electromagnetic signals which are registered by environment sensor 18 and are transmitted to evaluation and/or control apparatus 22 via at least one cable 20 in order to reconstruct a vehicle environment. Particularly preferably, environment sensor 18 is designed to be multi-channeled so that a plurality of different signals can be registered. Per registering channel, environment sensor 18 is preferably connected to evaluation and/or control apparatus 22 via at least one cable 20 or a BUS system, such as a CANBUS or LINBUS system, so that signals can preferably be transmitted and evaluated on selected channels.

In FIGS. 3 to 8, different options for guiding at least one cable 20 as intended by the invention are shown.

Figure 3:
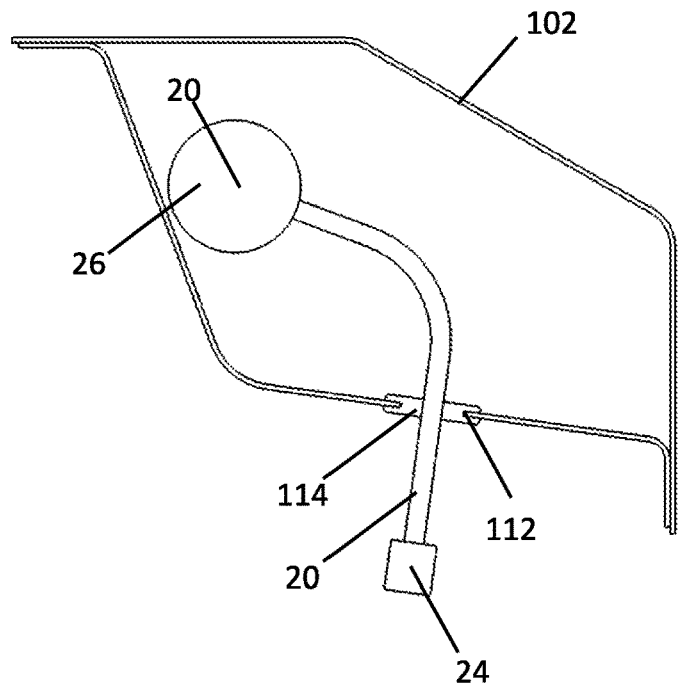
FIG. 3 shows a first exemplary embodiment of a cable guiding according to the invention.

In FIG. 3, an exemplary embodiment of a cable guiding is shown where at least one cable 20 is guided through a channel-shaped hollow or installation space of at least one chassis beam 102, 106. At least one chassis beam 102, 106 can be longitudinal beam 106 or transverse beam 102, for example (in the case of FIG. 3, a transverse beam 102 is exemplarily shown). Generally, a cable guiding is also possible via at least one of the A pillars, B pillars, C pillars and/or D pillars (see reference numeral 110, for example; see FIG. 2, for example). As FIG. 3 shows, at least one chassis beam 102, 106 comprises a passage and/or an opening and/or a bore 112 via which at least one cable 20 is guided in the inner, channel-shaped hollow of chassis beam 102, 106 starting from environment sensor 18 or rather a connection 24 of environment sensor 18. The passage and/or the opening and/or bore 12 can preferably comprise a seal 114, via which humidity is prevented from entering between the at least one cable 20 and a wall of chassis beam 102, 106. In the interior of the chassis beam, preferably several cables 20 are guided together as a cable harness.

Figure 4:
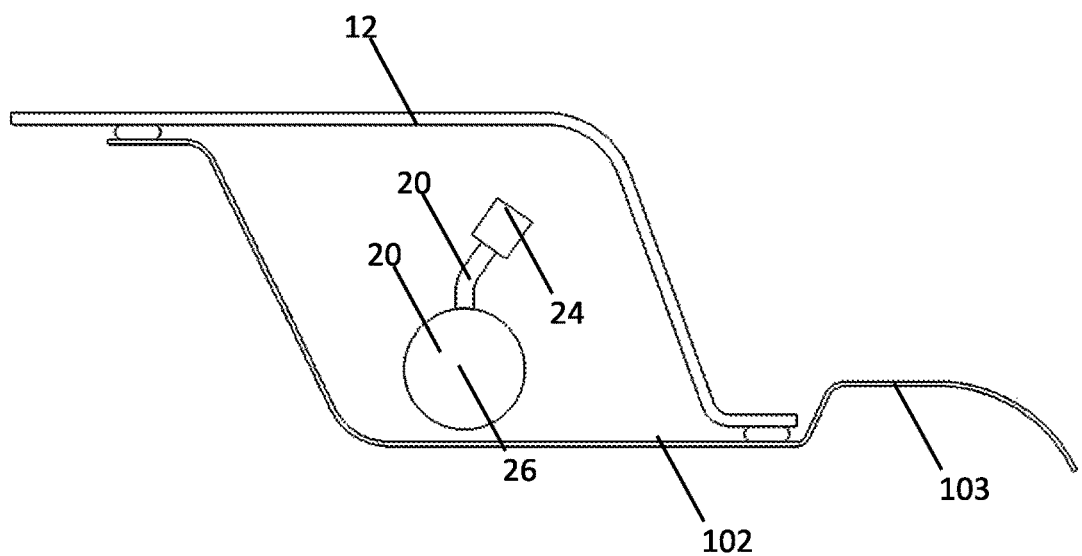
FIG. 4 shows a second exemplary embodiment of a cable guiding according to the invention.

Alternatively or additionally, it is possible at least one cable 20 or cable harness 26 is guided in the roof area in a hollow between vehicle chassis 103 and/or chassis roof frame 104 and panel component 12 (see FIG. 4). In this case, roof sensor module 10 is directly connected, in particular glued, to vehicle chassis 103 via a corresponding embodiment of panel component 12. For instance, panel component 12 and vehicle chassis 103 and/or the at least one chassis roof beam 102, 106 are formed complementarily to each other in such a manner that they abut via at least two abutment surfaces, but form the channel-shaped hollow in complementary arrangement. In this hollow, the at least one cable 20 including, where required, connection 24 is preferably provided. Generally, the environment sensor 18 itself can be disposed in this hollow too.

Figure 5:
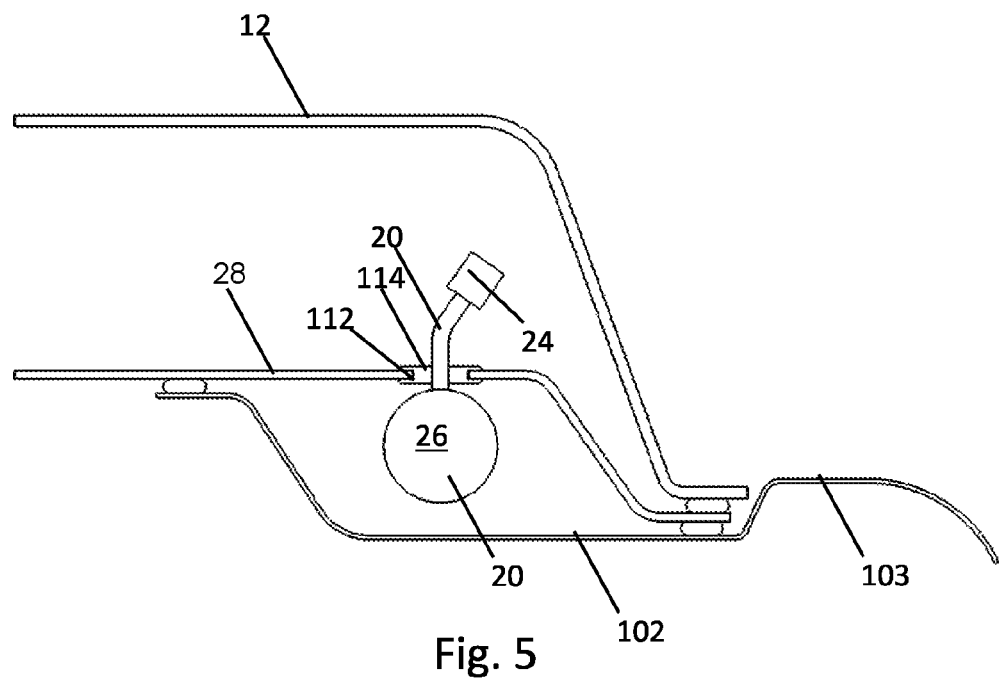
FIG. 5 shows a third exemplary embodiment of a cable guiding according to the invention.

In other exemplary embodiments, roof sensor module 10 can also comprise a roof module frame 28. Via roof module frame 28, roof sensor module 10 can be disposed at, in particular glued to, vehicle chassis 103, in particular at or to chassis roof frame 104. Roof module frame 28 can be disposed in such a manner at chassis roof frame 104 that a channel-shaped hollow is formed between chassis roof frame 104 and/or the at least one chassis roof beam 102, 106 and roof module frame 28, the hollow serving to lay the at least one cable 20 (see FIG. 5). In FIG. 5, passage 112 is shown again in an exemplary manner with seal 114, but now with roof module frame 28.

Figure 6:
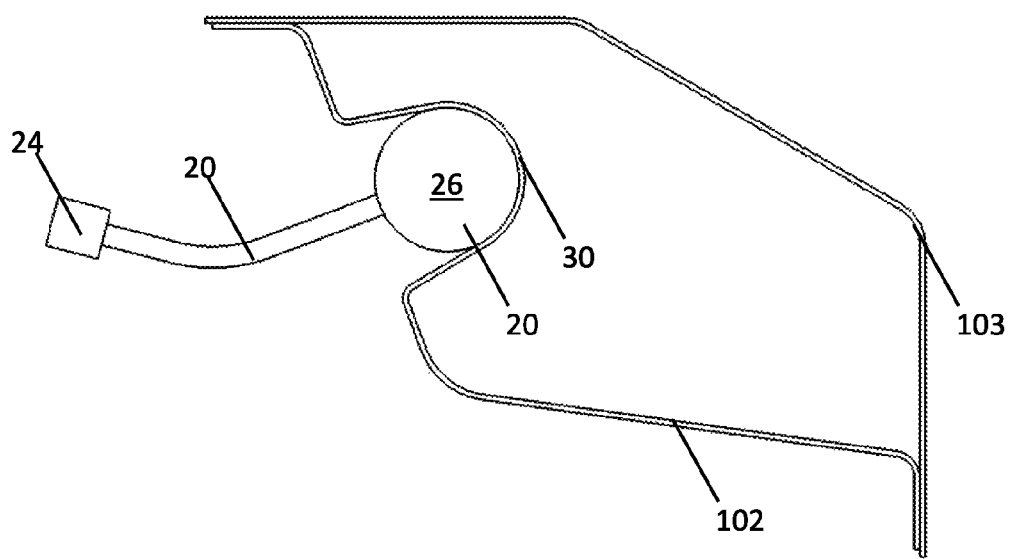
FIG. 6 shows a fourth exemplary embodiment of a cable guiding according to the invention.
Figure 7:
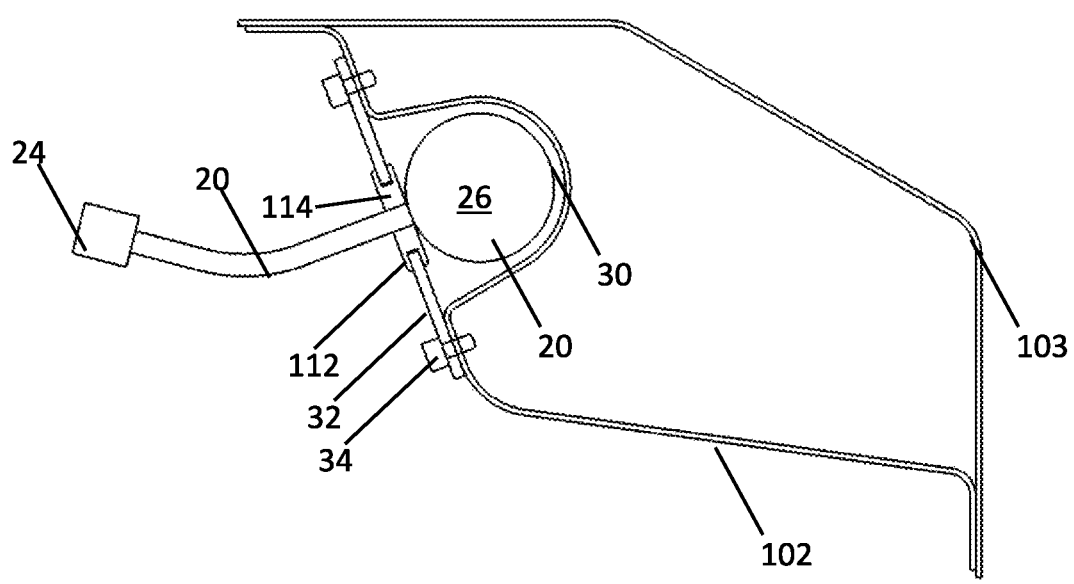
FIG. 7 shows a fifth exemplary embodiment of a cable guiding according to the invention.
Figure 8:
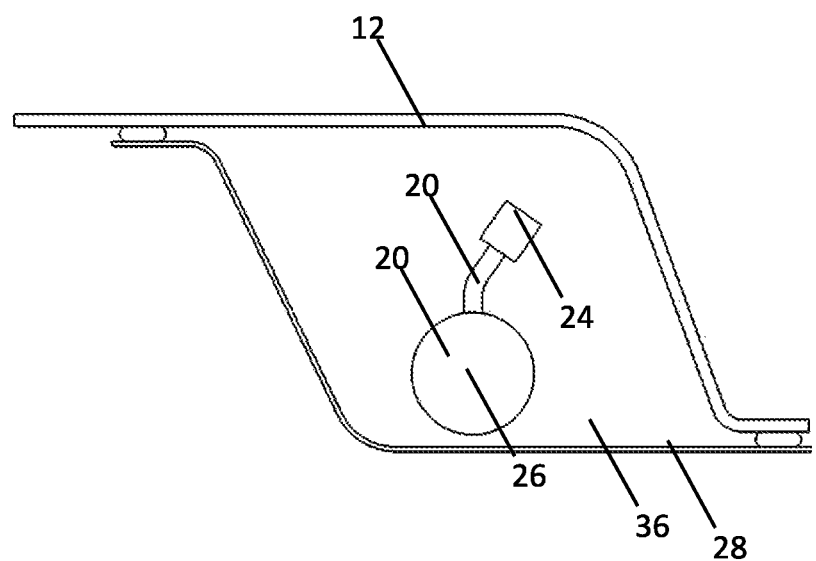
FIG. 8 shows a sixth exemplary embodiment of a cable guiding according to the invention.

In an alternative embodiment, a guide profile 30 can be provided at the at least one chassis beam 102, 106 and/or a carrier structure 24 formed via roof module frame 28, the at least one cable 20 or cable harness 26 being guided in guide profile 30. In the case of FIGS. 6 and 7, guide profile 30 is provided at a lateral wall of chassis beam 102, 106 directed toward a vehicle interior as a mold or recess whose profile cross section is groove-shaped and in which the at least one cable 20 is guided. In an alternative embodiment, it is also possible for the at least one cable 20 or harness 26 to be retained at chassis beam 102, 106 or the guide structure using a fixating element 32. Particularly preferably, fixating element 32 can comprise passage 112 and/or seal 114 for inserting or supplying cables. Presently, fixating element 32 is fastened to the at least one chassis beam 102, 106 via several screws 34. Other types of fixation are also possible.

In an alternative embodiment, roof module 10 can comprise roof module frame 28, which is connected in such a manner to panel component 12 that a channel-shaped carrier structure 36 is formed between roof module frame 28 and panel component 12. Channel-shaped carrier structure 36 can also be formed integrally at panel component 12. (See FIG. 8)

The invention claimed is:

1. A roof sensor module, comprising:
   a panel component, which forms at least sections of a roof cladding of a vehicle roof, the roof cladding functioning as an outer sealing surface of the roof sensor module,
   at least one environment sensor for charting a vehicle environment which is connected to at least one cable, and at least one channel-shaped carrier structure,
   wherein the at least one cable is guided along the channel-shaped carrier structure within a hollow cross section thereof and/or in that a channel-shaped guide profile is formed at the channel-shaped carrier structure,
   the at least one cable being guided along the channel-shaped guide profile.

2. The roof sensor module according to claim 1, wherein the at least one channel-shaped carrier structure forms at least a part of a roof module frame.

3. The roof sensor module according to claim 1, wherein the channel-shaped carrier structure is formed integrally at the panel component.

4. The roof sensor module according to claim 1, wherein the module comprises a roof module frame which is connected in such a manner to the panel component that the channel-shaped carrier structure is formed between the roof module frame and the panel component.

5. The roof sensor module according to claim 1, wherein the channel-shaped guide profile is formed integrally at the panel component.

6. The roof sensor module according to claim 1, wherein the module comprises a roof module frame, which is connected to the panel component and is formed integrally at the channel-shaped guide profile.

7. The roof sensor module according to claim 1, wherein the at least one cable is fixated within the channel-shaped carrier structure and/or within the channel-shaped guide profile by at least one fixating element.

8. A motor vehicle, comprising a vehicle chassis having a chassis roof frame, a roof sensor module according to claim 1, which is disposed on the chassis roof frame, and an evaluation and/or control unit and/or an energy source, which is disposed in an installation space within the vehicle chassis and is connected to the at least one environment sensor via the at least one cable.

9. A motor vehicle, comprising: a vehicle chassis having at least one chassis roof beam and a roof sensor module, which has a panel component, which forms at least sections of a roof cladding of a vehicle roof functioning as an outer sealing surface of the roof sensor module, and at least one environment sensor serving to chart a vehicle environment and connected to at least one cable, the roof sensor module being disposed at the vehicle chassis to form a vehicle roof, wherein at least one cable is guided along the channel-shaped chassis roof beam within a hollow cross section and/or in that a channel-shaped guide profile is formed at the channel-shaped chassis roof beam, the at least one cable being guided along the channel-shaped guide profile, and/or in that at least one cable guide channel is formed between the roof sensor module and the at least one chassis roof beam, the at least one cable being guided within and along a cable guide channel.

10. The motor vehicle according to claim 9, wherein the at least one chassis roof beam defines at least one transverse beam and/or at least one longitudinal beam, via which at least a part of a chassis roof frame is formed.

11. The motor vehicle according to claim 9, wherein the roof sensor module comprises a roof module frame and the at least one cable guide channel is guided between the roof module frame and the at least one chassis roof beam.

12. The motor vehicle according to claim 9, wherein the motor vehicle comprises an evaluation and/or control unit and/or a power source, which is disposed in an installation space within the vehicle chassis and via which the at least one cable is connected to the at least one environment sensor.

13. The motor vehicle according to claim 9, wherein the at least one cable is held within the channel-shaped chassis roof beam and/or within the channel-shaped guide profile via at least one fixating element.

14. The roof sensor module according to claim 2, wherein the at least a part of a roof module frame is a transverse module beam and/or a longitudinal module beam.

15. The motor vehicle according to claim 8, wherein the energy source is a battery.

16. The motor vehicle according to claim 12, wherein the power source is a battery.

* * * * *